Figure 1:
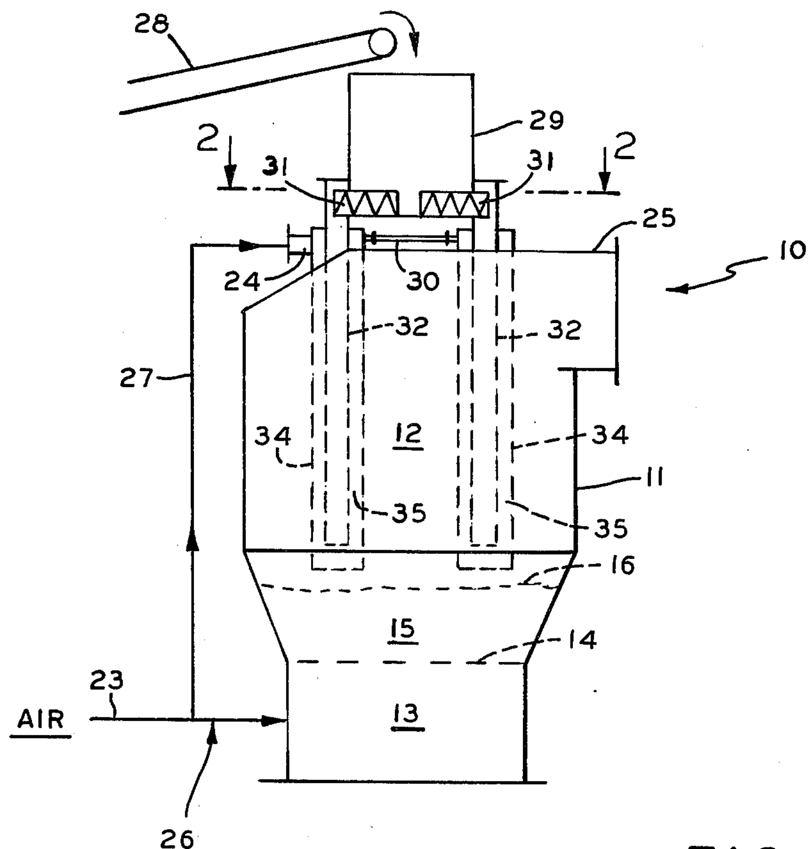

United States Patent [19]

Nauta

[11] 4,036,153

[45] July 19, 1977

[54] FLUID BED INCINERATOR FEED SYSTEM

[75] Inventor: Robin Gustav Nauta, Woodbury, Conn.

[73] Assignee: Dorr-Oliver Incorporated, Stamford, Conn.

[21] Appl. No.: 592,977

[22] Filed: July 3, 1975

[51] Int. Cl.[2] .................................................. F23G 5/00

[52] U.S. Cl. ..................................... 110/8 F; 110/28 J

[58] Field of Search ..................... 110/8 F, 28 J, 18 R, 110/29, 30; 122/4 D

[56] References Cited

U.S. PATENT DOCUMENTS

| | | | |
|---|---|---|---|
| 3,366,080 | 1/1968 | Albertson | 110/8 |
| 3,881,430 | 5/1975 | Katz | 110/28 J |

FOREIGN PATENT DOCUMENTS

| | | | |
|---|---|---|---|
| 1,084,977 | 9/1967 | United Kingdom | 110/8 |

*Primary Examiner*—Kenneth W. Sprague

*Attorney, Agent, or Firm*—H. M. Snyder; Burtsell J. Kearns; Theodore M. Jablon

[57] ABSTRACT

A fluidized bed incinerator is provided with feed pipes which are downwardly directed or vertically oriented and have access to the reaction chamber. Secondary air is introduced into the reaction chamber at a point above the fluidized bed through pipes which are concentric with the feed pipes and spaced therefrom in surrounding relation to define annular air passageways. Air passing into the reaction chamber through these passageways provides an air shield about the feed pipes.

4 Claims, 3 Drawing Figures

FLUID BED INCINERATOR FEED SYSTEM

This invention is directed to novel means for introducing feed and secondary air into the reaction chamber of a fluid bed reactor.

Fluid bed reactors have been successfully applied to the incineration of combustible waste streams such as sewage sludge and oil refinery wastes. In these reactors a bed of inert particles, sand, for example, is supported on a gas distribution or constriction plate. Air or another gas is passed through the constriction plate to "fluidize"the inert particles. Initially, after raising the bed temperature to a suitable level, fuel is injected into the bed and ignited to raise the bed to operating temperature and then the combustible waste is introduced. The waste undergoes combustion, generating a substantial amount of heat which makes it possible to reduce the amount of fuel introduced and, in some cases, may eliminate the necessity for the auxiliary fuel.

The purpose of the fluid bed incinerators is to completely consume the organic matter in the waste feed stream, leaving as a residue only an inert ash, and to perform this combustion reaction in a manner which does not produce objectionable odors. Odorless combustion is achieved by complete oxidation of the organic matter and requires, as a practical matter, temperatures at least in the range from about 700° C to about 800° C depending on the percent excess air.

In operating fluid bed incinerators, it is possible to introduce all of the air required for fluidizing the bed and for combustion of the waste material below the constriction plate. In such an incinerator the bed diameter tends to be rather large and a substantial amount of the combustion tends to occur in the freeboard area above the fluidized bed, rather than in the bed itself, a phenomenon known as "freeboard burning". Freeboard burning is less well controlled than combustion within the bed and in complete combustion is more likely to occur with the resultant production of undesirable odors.

A novel structure has now been provided for a fluid bed reactor in which the feed pipes and secondary air pipes cooperate so that the flow of secondary air protects the feed pipes.

It is an object of this invention to provide an improved system for the introduction of feed and secondary air into the reaction chamber of a fluid bed incinerator or similar device.

It is a further object of this invention to provide in a fluidized bed incinerator an improved feed structure capable of handling a relatively dry feed material.

Figure 2:
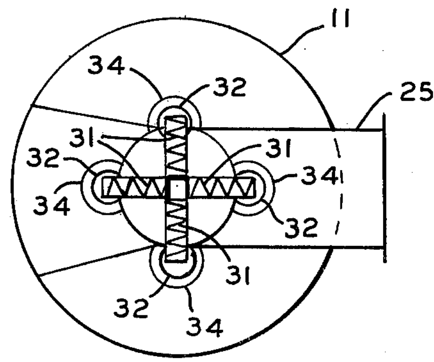
Figure 3:
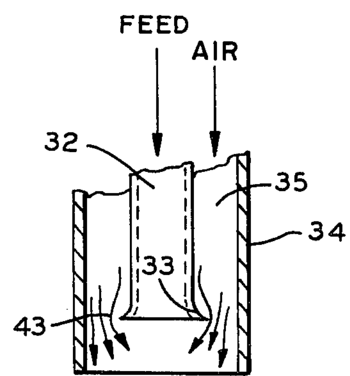

Other objects and advantages will become apparent from the following description taken in conjunction with the accompanying drawings in which:

FIG. 1 is a schematic elevational view, partially in section, of a fluidized bed incinerator incorporating vertically oriented pipes for the introduction of feed material and secondary air in accordance with this invention, FIG. 2 is a plan view of the fluid bed unit of this invention taken along line 2—2 of FIG 1, FIG. 3 is an enlarged fragmentary view, partially in section, of the outlet ends of the feed and secondary air pipes in accordance with this invention.

Broadly speaking, the fluid bed unit of this invention is provided with downwardly directed means for conjointly introducing feed and secondary air into the reaction chamber of the fluid bed unit.

More specifically, the fluid bed incinerator of the present invention incorporates a top feed system in which the feed is routed to one or more vertically oriented feed pipes which penetrate the top of the incinerator and extend downwardly to a position relatively close to the level of the fluidized bed within the reactor chamber; the feed pipes being positioned centrally of surrounding secondary air pipes which provide an annular air passageway about said feed pipes for said secondary air along the entire length of said feed pipe.

Referring now to the drawings, in FIGS. 1 and 2 there is illustrated a fluidized bed reactor 10 comprising a reactor shell 11. Within the reactor shell 11 the constriction plate 14 divides the fluid bed unit internally into two compartments, a windbox 13 below the constriction plate 14 and a reaction chamber 12 above. On the constriction plate 14 a body of fluidized particulate solids 15, sand for example, is provided and the expanded fluidized bed reaches the level indicated by the numeral 16. The feed system of the reactor includes an endless belt 28, a feed bin 29 located on top of the incinerator 10 and a plurality of feed screws 31 located at the bottom of the bin. The feed screws 31 communicate with the feed pipes 32 which extend downwardly through the top of the incinerator 10 to a point well within the reaction chamber and approaching the top level 16 of the expanded fluidized bed 15. Air is supplied (by means not shown) to air line 23. Air line 23 supplies fluidizing air line 26 and secondary air line 27. Fluidizing air line 26 communicates with the windbox 13, while secondary air line 27 supplies air through inlet 24 to secondary air pipes 34 which are interconnected by means of conduits 30. The air pipes 34 each surround and are concentric with and spaced from feed pipes 32. Between air pipe 34 and feed pipe 32 there is an annular gas passageway 35.

In FIG. 3 an enlarged view of the outlet ends of feed pipe 32 and air pipe 34 shows an embodiment in which flared end 33 on the feed pipe 32 forms a constriction 43 in the annular air passageway 35.

In the operation of the fluid bed unit of the invention, sludge, which may be in the form of relatively dry filter press cake, is fed by endless belt 28 into the feed bin 29. Feed screws 31 convey the material from feed bin 29 to the feed pipes 32. In some cases it may be necessary, due to the consistency of the feed, to have vertically mounted feed screws (not shown) in the top part of the feed pipe to force feed material down the pipe. In any case, the feed descends through pipe 32 and falls into the fluidized bed 15. Air enters the windbox 13 from fluidizing air line 26, passes through the constriction plate 14 and fluidizes the particulate solids of the bed 15. The air of line 23 may be either preheated or cold. Secondary air line 27 supplies air to the annular passage 35 between the air pipe 34 and the feed pipe 32. This air protects the feed pipe 32 against the effects of the hot solids and gases in the freeboard region 12 of the reactor 10. At the same time this air acts to cool the air pipe 34 and so protect the air pipe from the high temperatures prevailing in the reaction chamber. The secondary air issuing from air passageway 35 tends to cause feed material floating on top of the fluidized bed to be forced back into the fluidized bed to thereby minimize freeboard burning. In addition, the secondary air will tend to allow completion of the combustion reaction at or close to the top of the fluidized bed, thereby restricting the extent of freeboard burning in the reaction chamber. A constriction 43 in the annular air passage 35, if provided, increases the velocity of the air at that point so that when feed fails for one reason or another to flow through the feed pipe, the secondary air prevents the gases in the freeboard region from coming up through waste feed pipe 32. In this connection, it is observed that the secondary air in air passage 35 is at a pressure equal to that of the fluidizing air in the windbox and is therefore at a higher pressure than the gases emerging from the fluidized bed 15 due to the pressure drop sustained in passing through the constriction plate and the fluidized bed. It should also be noted that the feed pipe is closed off by the screw feeders and the material therein, as well as the material in the feed bin. This construction, of itself, provides a reasonably effective seal at the upper end of the feed pipe 32. The feed material fed into the bed is largely burned within the bed, the fluidizing air supporting this combustion. However, some combustible gases and fine solids do escape the bed and the secondary air supports combustion of this material and this reaction occurs largely in the region close to the bed.

The feed pipes 32 with their cooling air system (the air pipes 34) are permitted to expand downward toward the fluidized bed upon heating. If stabilization of the pipes is desired, a slip ring or guide ring assembly (not illustrated) can be provided within the fluidized bed reactor.

Introducing some of the air required for combustion as secondary air above the fluidized bed has the advantage that less air flow is required to be passed through the constriction plate, making it possible to utilize a fluid bed reactor having a smaller diameter at the constriction plate level. This provides certain economies in the construction of the reactor. However, since secondary air is introduced at the top of the fluidized bed, it is necessary to taper the fluidized bed outward to accommodate this additional air and this taper may be extended to the ultimate diameter of the freeboard.

There has thus been provided a feed system for a fluid bed unit such as an incinerator wherein a proper distribution of the feed material is assured and, at the same time, secondary air required for proper combustion is supplied.

Although the present invention has been described with particular reference to preferred embodiments, it will be apparent to those skilled in the art that variations and modifications may be made without departing from the essential spirit and scope of the invention. It is intended to include all such variations and modifications.

I claim:

1. A fluid bed unit comprising a reaction chamber, a windbox separated from said reaction chamber by a constriction plate, a body of particulate solids subject to fluidization on said constriction plate, air supply means for introducing fluidizing air into said windbox, vertically disposed feed means for conducting feed into said reaction chamber, said feed means extending into said reaction chamber through the top of said fluid bed unit and terminating close to and above the level of the fluidized body of particulate solids in said reaction chamber and at least one secondary air supply pipe surrounding and concentric with said feed pipe but spaced therefrom so that an annular air passage is provided between said pipes for downwardly discharging a secondary air supply into said reaction chamber at a level close to and above, but directed toward, the fluidized body of particulate solids.

2. A fluid bed incinerator comprising a reaction chamber, a windbox separated from said reaction chamber by a constriction plate, a body of particulate solids subject to fluidization on said constriction plate, air supply means for introducing fluidizing air into said windbox through a fluidizing air conduit, a feed bin located on top of said incinerator to contain combustible feed, feed screws positioned horizontally in the bottom of said feed bin to convey said combustible feed to a plurality of vertically disposed feed pipes, said feed pipes extending into said reaction chamber through the top of said incinerator and terminating close to and above said fluidized body of particulate solids, each of said feed pipes being surrounded by and concentric with a secondary air pipe connected to said air supply means, each secondary air pipe being spaced from the feed pipe with which it cooperates to thereby provide an annular air passage therebetween for downwardly discharging a secondary air supply into said reaction chamber at a level close to and above, but directed toward, the fluidized body of particulate solids and each of said annular air passages having a constriction adjacent the end thereof to increase air velocity at that point.

3. A fluid bed unit comprising a reaction chamber, a windbox separated from said reaction chamber by a constriction plate, a body of particulate solids subject to fluidization on said constriction plate, air supply means for introducing fluidizing air into said windbox, vertically disposed feed means for conducting feed into said reaction chamber, said feed means extending into said reaction chamber through the top of said fluid bed unit and terminating close to and above the level of the fluidized body of particulate solids in said reaction chamber, at least one secondary air supply pipe surrounding and concentric with said feed pipe but spaced therefrom so that an annular air passage is provided between said pipes for downwardly discharging a secondary air supply into said reaction chamber at a level close to and above, but directed toward, the fluidized body of particulate solids and a constriction in said annular air passage adjacent the discharge end thereof.

4. The fluid bed unit of claim 3, wherein said constriction of said air passage is formed by a flared portion on said discharge end of said secondary air pipe.

* * * * *